F. KASISKE.
Coffee-Roaster.
No. 197,862. Patented Dec. 4, 1877.
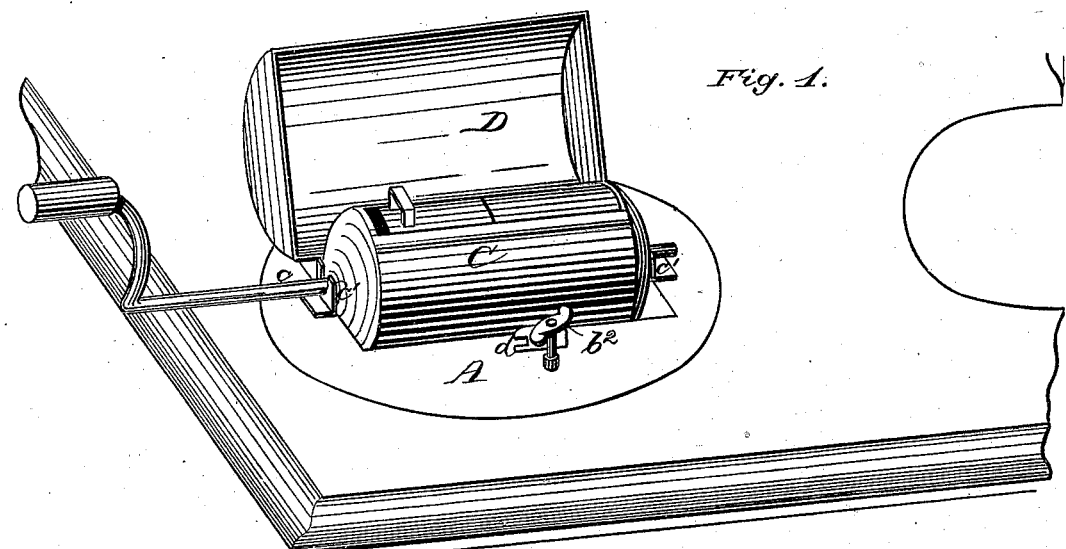
Fig. 1.
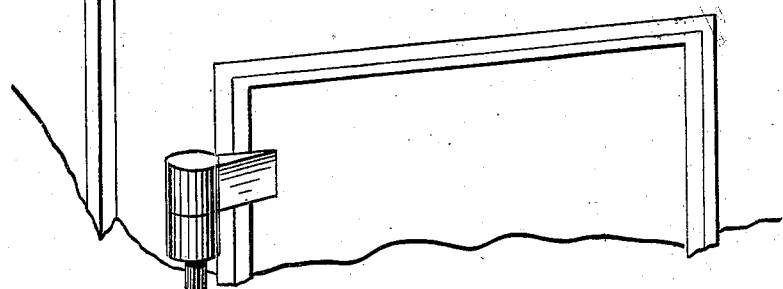
Fig. 2. Fig. 3.
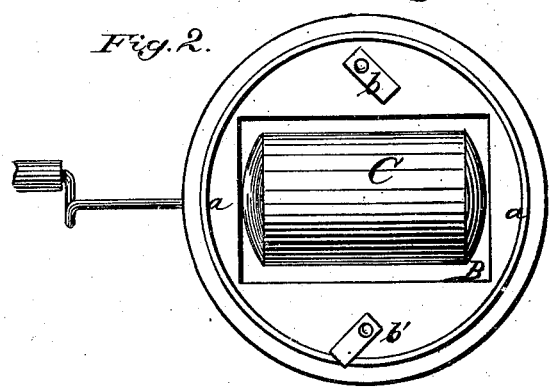
Attest:
August Petersohn
C. H. Hansen
Inventor:
Friedrich Kasiske,
pr. C. A. Snow & Co.
Attorneys.

UNITED STATES PATENT OFFICE.

FRIEDRICH KASISKE, OF NORTH FREEDOM, WISCONSIN.

IMPROVEMENT IN COFFEE-ROASTERS.

Specification forming part of Letters Patent No. 197,862, dated December 4, 1877; application filed September 24, 1877.

*To all whom it may concern:*

Be it known that I, FRIEDRICH KASISKE, of North Freedom, in the county of Sauk and State of Wisconsin, have invented certain new and useful Improvements in Coffee-Roasters; and I do hereby declare that the following is a full, clear, and exact description thereof, which will enable others skilled in the art to which it appertains to make and use the same, reference being had to the accompanying drawings, which form a part of this specification, and in which—

Figure 1 is a perspective view, the cover being open. Fig. 2 is a bottom plan, and Fig. 3 is a vertical cross-section.

Similar letters of reference indicate corresponding parts in all the figures.

This invention relates to certain improvements in coffee-roasters; and it consists in the improved construction and arrangement of parts hereinafter more fully shown and described.

In the drawings, A is a plate of suitable size to fit over one of the fire-holes in a stove or range, and having a downward-projecting rim or flange, $a$, fitting in the hole. It also has, on the under side, two clasps, $b\ b^1$, the latter of which may be turned by a handle, $b^2$, projecting on the upper side of the plate, by which it may be secured in position upon the stove.

The clasps $b\ b^1$, it will be seen, consist of downward-projecting screw-threaded pins $e^1$ $e^1$, upon which the lateral clasps or blades $e^2$ $e^2$ are vertically adjustable. The plate A, with its attachments, may, therefore, with equal facility be secured upon stoves or ranges the top plates of which are of unequal thickness.

The plate A has an opening, B, for the cylinder C, which is turned by a crank-shaft, $c$, having its bearings $c'\ c'$ at the ends of the opening B. D is a hinged metallic cover, which closes over the cylinder, so as to prevent the heat from escaping. It is provided with a locking device, $d$, to keep it in position, and thus also prevent the shaft of the cylinder from coming out of its bearings while in operation.

The cylinder C is made, preferably, of sheet metal, and is provided with a sliding cover, $e$. It also has on the inside a flange or projection, $f$, which serves to stir the coffee when the cylinder is rotated, so as to prevent it from getting scorched.

In operation the plate A is secured by the adjustable clasps $b\ b^1$ over the fire-hole of a stove or range. The cylinder is then placed in position and rotated (the cover D being closed) until the coffee is roasted, when it may be readily taken off. It may also at times be readily taken off for the purpose of inspecting its contents.

Having thus described my invention, I claim and desire to secure by Letters Patent of the United States—

In a coffee-roasting apparatus constructed substantially as herein described, the adjustable clamps $b\ b^1$, consisting of downward-projecting screw-threaded pins $e^1\ e^1$, having vertically-adjustable lateral blades or clasps $e^2\ e^2$, substantially as described, for the purpose herein shown and specified.

In testimony that I claim the foregoing as my own I have hereto affixed my signature in presence of two witnesses.

FRIEDRICH KASISKE.

Witnesses:
 G. V. SCHOLLENBERG,
 JOHN R. FLINT.